United States Patent [19]

Young et al.

[11] Patent Number: 4,852,902
[45] Date of Patent: Aug. 1, 1989

[54] TOWING HITCH COVER

[75] Inventors: David A. Young, Plymouth; Kenneth E. Bol, II, Canton, both of Mich.

[73] Assignee: The Fisher Group, Inc., Canton, Mich.

[21] Appl. No.: 196,044

[22] Filed: May 19, 1988

[51] Int. Cl.$^4$ ............................................. B60R 27/00
[52] U.S. Cl. .................................................. 280/507
[58] Field of Search ................... 280/507, 504, 491 E; 150/52 R, 52 K; 220/306, 307; 138/89; 24/634, 113 MP, 573; 292/DIG. 38, 78; 70/163

[56] References Cited

U.S. PATENT DOCUMENTS

| | | | |
|---|---|---|---|
| 3,782,761 | 1/1974 | Cardin | 280/507 |
| 4,040,641 | 8/1977 | Rieke | 280/507 |
| 4,655,364 | 4/1987 | Swapp | 220/307 |
| 4,761,319 | 8/1988 | Kraus | 220/307 |

FOREIGN PATENT DOCUMENTS 2176759  1/1987  United Kingdom ................ 280/507

*Primary Examiner*—Charles A. Marmor
*Attorney, Agent, or Firm*—Rhodes and Boller

[57] ABSTRACT

A decorative and protective cover for covering the end of a towing hitch tube which is exposed when the drawbar that is used for towing a trailer is removed from the hitch tube. The cover is a one-piece molded plastic part that has a covering portion comprising an end wall that is disposed in end covering relation to the end of the hitch tube and an integral attaching portion that projects from a central region of the cover end wall for releasably attaching the cover to the hitch tube. The cover further includes a top wall and side walls that are in top and lateral covering relation to the hitch tube. It also has a partial bottom wall that is an underlying relation to the hitch tube but contains a centrally located notch that provides access to the attaching portion for unlatching the attaching portion from the hitch tube when it is desired to remove the cover. The attaching portion comprises a tubular wall fitting closely into the hitch tube and an integral catch that snaps into a hole in the hitch tube which is used for pinning the drawbar to the hitch tube when the drawbar is in use. The cover also contains covering provisions for covering safety chain attachment holes that are provided to either side of the hitch tube. Advantageously the cover is fabricated as an injection molded plastic part from a tough, durable plastic such as polypropylene.

23 Claims, 3 Drawing Sheets

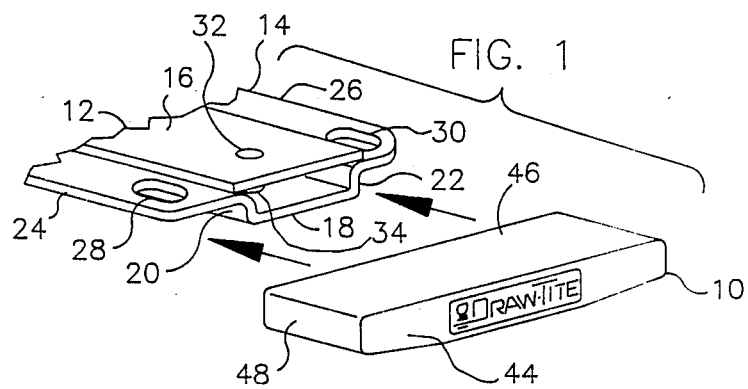
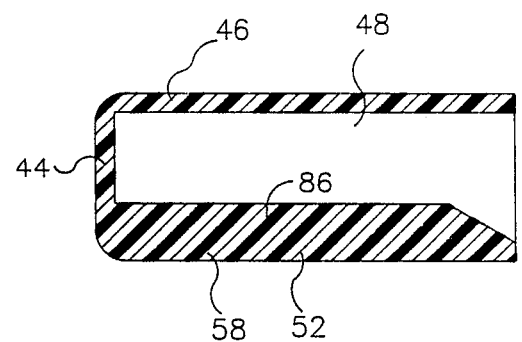
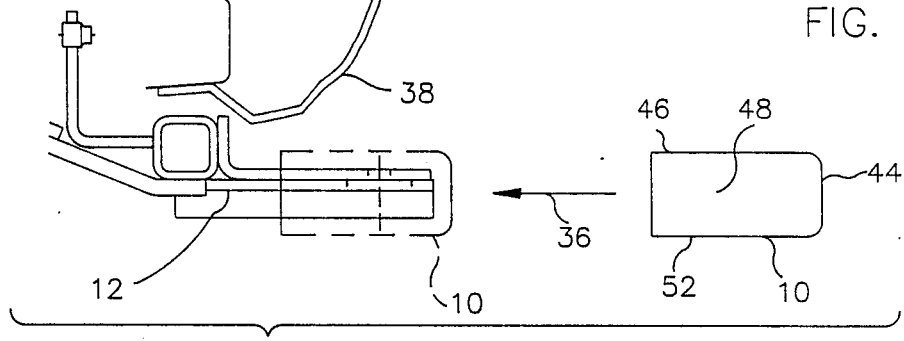

4,852,902

TOWING HITCH COVER

BACKGROUND AND SUMMARY OF THE INVENTION

This invention relates generally to towing hitches that are installed on automotive vehicles for towing trailers. Specifically, the invention relates to a decorative and protective cover for covering the end of the hitch tube which is exposed when the drawbar that is used for towing a trailer is removed from the hitch.

Certain types of towing hitches contain a removable drawbar that can be disconnected from the hitch and stowed in a suitable location when the hitch is not in use. The hitch comprises a drawbar-receiving tube, also sometimes called the hitch tube, into which one end of the drawbar is inserted. Typically, a pinned connection is used to securely join the two parts in assembly. Use of a removable pin permits the connection to be conveniently broken when the drawbar is to be disconnected and stowed. With the drawbar stowed, the end of the hitch tube is exposed, and therefore the use of a cover to cover this otherwise exposed end of the hitch tube is often deemed desirable.

In a preliminary novelty search conducted in connection with this invention, the following U.S. patents relating to covers for towing hitches were developed: U.S. Pat. Nos. 2,342,907; 3,271,050; 3,782,761; and 4,040,641. The applicant was previously aware of the commonly assigned U.S. Pat. No. 4,509,770 relating to a Drawbar Cover. The latter three patents from the search disclose various embodiments of covers that fit into the open end of a hitch tube after the drawbar has been disconnected and removed. The hitch tube typically contains holes which align with corresponding holes in the drawbar when the drawbar is inserted into the hitch tube. A removable pin passes through these aligned holes to connect the drawbar to the hitch. When the pin is removed and the drawbar separated from the hitch tube, these holes are available for use, and in U.S. Pat. No. 3,782,761, the cover contains a key operated locking mechanism that releasably locks the cover to one of these holes after the cover has been inserted into the end of the hitch tube.

The present invention relates to an improvement in the state of the art as reflected by these prior patents. A hitch tube cover embodying principles of the present invention affords improvements in several respects. For one, the cover of the present invention is a one-piece molded plastic element which contains a covering portion and a releasable attaching portion in a single unitary piece. The covering and releasable attaching portions are advantageously configured to perform their respective functions in new and useful ways in association with a hitch tube.

One of the features of the covering portion is the inclusion of an end covering zone not only for the exposed end of the hitch tube per se, but also for covering safety chain attachment holes that are provided on the hitch to either lateral side of the hitch tube. The disclosed embodiment of cover further comprises not only a laterally elongate end wall that forms the end covering zone, but also a top wall extending from the end wall in top covering relation to at least a portion of the top of the hitch tube and the safety chain attachment holes that lie to either side. Still further, the cover includes vertical side walls that extend both downwardly from the lateral ends of the top wall and forwardly from the lateral ends of the end wall so as to be in lateral covering relation to the otherwise exposed lateral sides of the hitch tube and safety chain attachment holes. The cover also comprises a partial bottom wall that extends both laterally inwardly from the lower edges of the sides walls and forwardly from the adjoining lower edge of the end wall while leaving clearance over a laterally central region so that the releasable attaching portion can be conveniently accessed when it is desired to remove the cover from the hitch tube.

The attaching portion comprises a tubular walled structure that projects inwardly from a central region of the cover's end wall and closely fits the open end of the hitch tube. This structure has a generally rectangular configuration, and a resiliently flexible catch is integrally formed in this tubular wall structure. Upon installation of the cover to the hitch tube, this resiliently flexible catch is resiliently deflected out of the way during the initial insertion of the tubular walled attaching structure into the open end of the hitch tube. Upon full insertion of the tubular walled attaching structure into the open end of the hitch tube, the catch resiliently relaxes to engage one of the holes in the wall of the hitch tube that is used for the pinned connection of the drawbar to the hitch tube when the drawbar is in use. The clearance that is provided in the partial bottom wall of the cover provides access to the catch, enabling the catch to be disengaged from the hole when it is desired to remove the cover from the hitch tube.

A still further aspect of the invention is that the cover is especially adapted for a hitch on a towing vehicle which has decorative fascia that extends across the rear of the towing vehicle's body. The cover is adapted for a complementary cooperative relationship with this fascia in covering the exposed hitch tube which closely underlies the fascia.

The foregoing features, advantages, and benefits of the invention, along with additional ones, will be seen in the ensuing description and claims which should be considered in conjunction with the accompanying drawings. The drawings disclose a presently preferred embodiment in accordance with the best mode contemplated at this time in carrying out the invention.

BRIEF DESCRIPTION OF THE DRAWINGS

FIG. 1 is a rear perspective view illustrating, in exploded relationship, a cover embodying principles of the present invention and a portion of a hitch tube that is a part of a hitch on a towing vehicle, the remainder of the hitch and the towing vehicle not being shown in FIG. 1.

FIG. 2 is a side elevational view of the hitch, including additional portions of the towing vehicle, the cover being shown both in separated and in assembly relationship to the hitch tube.

FIG. 8 is a cross sectional view taken through the cover in the direction of arrows 8—8 in FIG. 3.

DESCRIPTION OF THE PREFERRED EMBODIMENT

Figure 3:
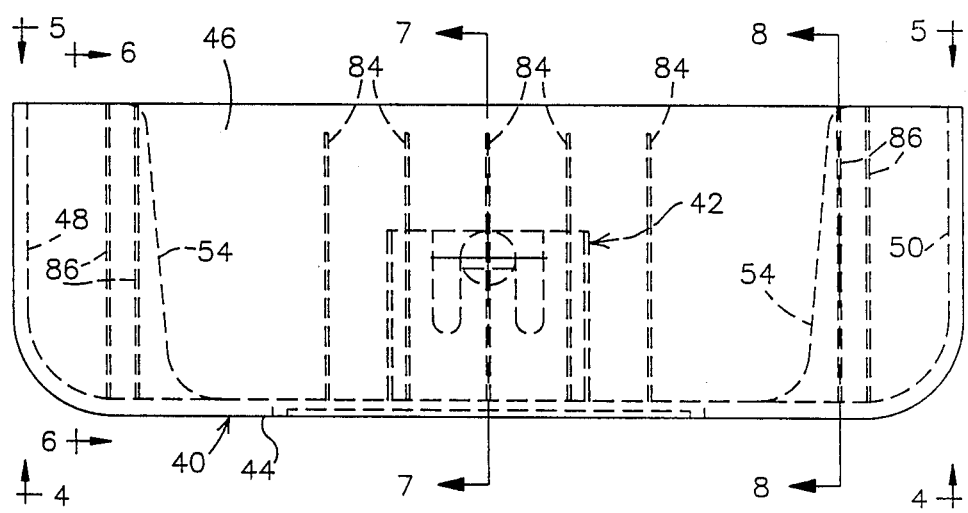
FIG. 3 is a top plan view of the cover shown by itself on an enlarged scale from the views of FIGS. 1 and 2.
Figure 4:
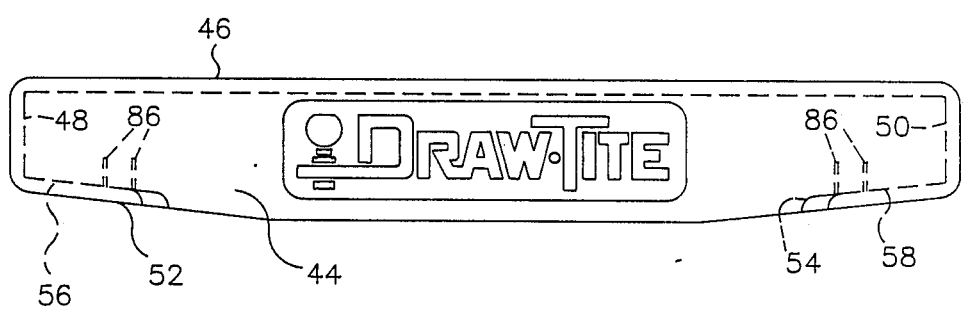
FIG. 4 is an elevational view of the end wall of the cover as taken in the direction of arrows 4—4 in FIG. 3.
Figure 5:
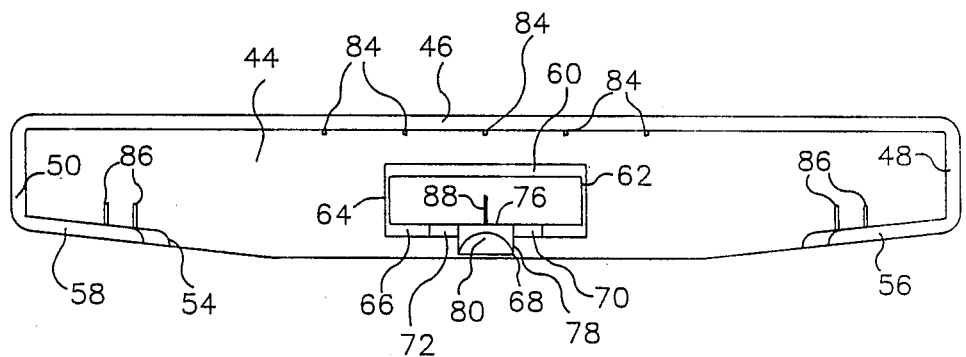
FIG. 5 is an elevational view of the interior of the cover as taken in the direction of arrows 5—5 in FIG. 3.
Figure 9:
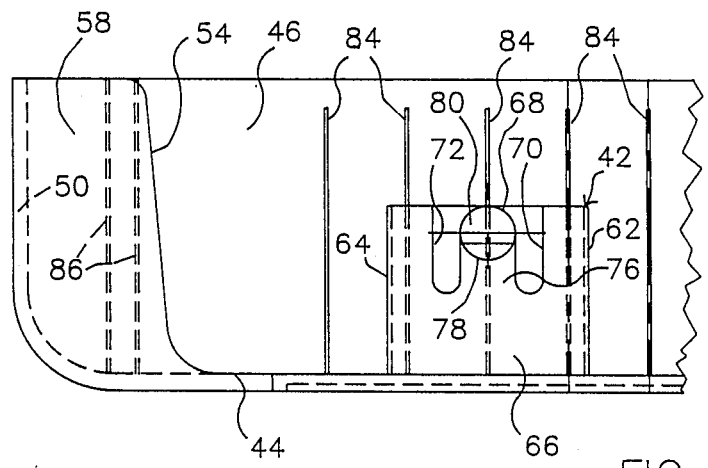
FIG. 9 is a fragmentary bottom view of the cover shown by itself.
Figure 6:
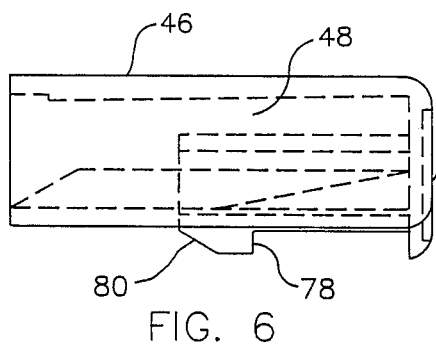
FIG. 6 is an elevational view of the left side wall of the cover as taken in the direction of arrows 6—6 in FIG. 3.
Figure 7:
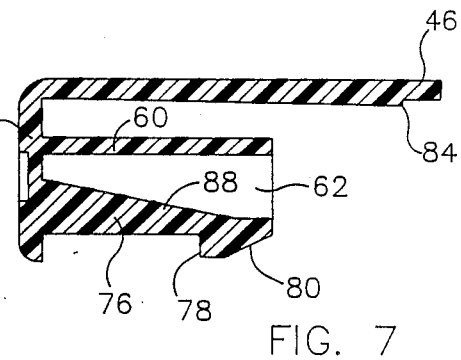
FIG. 7 is a cross sectional view taken through the cover in the direction of arrows 7—7 in FIG. 3.

FIG. 1 shows a cover 10 embodying principles of the present invention adapted for fitting onto the open exposed end of a towing hitch tube 12. The illustrated tube 12 is depicted as a two part construction consisting of formed metal parts 14 and 16. Part 14 is shaped to have a central channel defined by a bottom wall 18 and side walls 20 and 22. Flanges 24 and 26 are disposed laterally outwardly, extending from the upper edges of side walls 20 and 22 respectively. Elongated holes 28 and 30 are punched in the respective flanges 24 and 26. These holes are for attachment of safety chains (not shown) of a trailer that is towed by the towing vehicle with the drawbar installed.

Part 16 has a width somewhat greater than that of the channel shaped portion of part 14. The respective marginal side edges of part 16 are disposed against and joined to flanges 24 and 26 respectively whereby part 16, side walls 20 and 22, and bottom wall 18 form a rectangular shaped tube. A circular hole 32 is provided in part 16, and there is a hole 34 in bottom wall 18 vertically aligning with hole 32.

When the hitch is in use, one end of a drawbar (not shown) which is of rectangular transverse cross sectional shape fits into the open end of the hitch tube. The drawbar has a through-hole which aligns with holes 32 and 34. A removable pin is passed through the three aligned holes to join the drawbar to the hitch. The opposite end of the drawbar typically contains a towing ball that is used to make attachment to a coupling at the forward end of a trailer that is to be towed. The drawbar is disconnected by removing the pin from the aligned holes and pulling the drawbar horizontally outwardly from the hitch tube. Cover 10 can now be attached to the hitch tube, fitting onto and covering the tube's open end.

FIG. 2 is a side elevational view showing cover 10 in solid lines in spaced relation to the hitch tube, much in the same manner as in FIG. 1. When the cover is advanced in the direction of arrow 36, it fits over and attaches to the end of the hitch tube. The installed position of the cover is shown in phantom lines in FIG. 2.

When covering the end of the hitch tube, cover 10 has a cooperative effect with decorative fascia 38 that is at the rear of the towing vehicle. The cover presents an attractive appearance that blends nicely with the fascia and at the same time conceals the hitch tube when viewed in a direction looking toward the rear of the towing vehicle that contains the fascia and hitch. Further details of cover 10 can be seen with reference to the remaining drawing FIGS. 3 through 9.

Cover 10 is a one-piece molded plastic element that comprises a covering portion, 40 generally, and an attaching portion, 42 generally. The covering portion comprises a vertical end wall 44, a horizontal top wall 46, vertical side walls 48 and 50, and a generally horizontal partial bottom wall 52. The width of the cover as measured between the insides of side walls 48 and 50 is greater than the width of the hitch tube as measured between the laterally outer edges of flanges 24 and 26. The depth of top wall 46 relative to the hitch tube is such that when the cover is installed on the end of the hitch tube, the top of the hitch tube is covered from its end to a depth beyond holes 28, 30 and 32. Bottom wall 52 contains a rather large, centrally located, notch 54 that leaves bottom covering portions 56 and 58 immediately adjacent side walls 48 and 50 respectively and in underlying relation to flanges 24 and 26 respectively.

While these covering portions 56, 58 are generally horizontal, they in fact are inclined slightly downwardly and inwardly from the respective side walls 48, 50. As viewed in FIG. 4, the lower edge of end wall 44 is similarly inclined along its laterally outer ends, but for a greater distance than covering portions 56, 58 so that the horizontal central region of the lower edge of end wall 44 is vertically below covering portions 56, 58. This construction of inclining the laterally outer ends of the lower portion of the cover provides a unique styling effect; it also provides slightly greater road clearance for the laterally outwardly disposed covering portions 56, 58 in comparison to the road clearance provided for the horizontal central region of the lower edge of end wall 44. Styling of the cover is also enhanced by radiusing the transition between end wall 44 and side walls 48, 50, as best seen in FIG. 3.

Attaching portion 42 projects perpendicularly away from the interior surface of end wall 44, and is in the general form of a rectangular shaped tubular wall having a top wall portion 60, side wall portions 62 and 64, and a bottom wall portion 66. The attaching portion is substantially centered with respect to end wall 44 by having top wall portion 60 spaced from top wall 46 approximately the same distance that bottom wall portion 66 is spaced from the central lower edge of end wall 44, and by having side wall portions 62 and 64 respectively equally spaced from side walls 48 and 50 respectively.

In the illustrated example, each wall portion 60, 62 and 64 is of a generally rectangular shape and extends to a common depth from end wall 44, which by way of example is about one and one-half inch. Although bottom wall portion 66 has a generally rectangular shape, it is not fully rectangular in the sense of wall portions 60, 62 and 64. Rather wall portion 66 is formed to have an integral catch 68 that is defined by a pair of slots 70, 72 which begin at the edge of wall portion 66 that is most distant from end wall 44 and extend toward end wall 44 about half way along the depth of wall portion 66. The interior root ends of the slots are preferably semi-circularly rounded, as shown.

Catch 68 comprises a tongue 76 whose nominal thickness is equal to that of wall portion 66 and a depending, generally circular, button 78 at the free distal end of tongue 76. The leading portion of the button is truncated, or beveled, at 80 to form a camming surface that is adapted to abut the edge of wall 18 when the cover is first fitted against the hitch tube for assembly thereto. Continued advancement of the cover onto the end of the hitch tube after such initial fitting, serves to increasingly deflect the catch upwardly, allowing the tubular walled attaching portion to slide into the receiver tube. Because the wall portions 60, 62, 64, 66 serve to closely locate the cover with respect to the hitch tube's axis, the deflected button will come into registry with the lower hole 34 in the hitch tube when the attaching portion has been essentially fully inserted onto the end of the hitch tube with the inside of end wall 44 virtually abutting the end of the hitch tube. At this time the catch resiliently relaxes to cause the button to be displaced downwardly into hole 34. The nature of this attachment would be a considered snap-in type of attachment, and it is to be noted that this snap-in attachment occurs automatically simply by pushing the cover onto the end of the hitch tube. No additional operations, such as locking or otherwise securing the cover in place, are required.

In the fully installed, snapped-in, position of the cover, top wall 46 overlies the top of the free end of the hitch tube, including holes 28, 30 and 32; side walls 48 and 50 cover the sides; and the bottom wall portions 56 and 58 are in underlying relations to the bottom surfaces of the flanges 24, 26. Hence, when one views the rear of the vehicle, the cover conceals virtually the entire projecting end of the hitch tube from view.

However, were one to look from underneath, he would see the underside of the hitch tube and button 78 disposed in hole 34. The button is thereby rendered accessible for upward deflection out of hole 34 when it is intended to remove cover 10 from hitch tube 12. It may be desirable to use an end of an elongate blunt instrument to engage the button and deflect it upwardly through the hole while the cover is being grasped and pulled outwardly. When the catch has cleared the hole, the outward force exerted on the cover will be effective to separate it from the hitch tube.

The cover is therefore conveniently installable on and conveniently removable from the hitch tube. The exterior surface of the cover may be treated by conventional procedures to provide a suitable finish appearance such as a general matte appearance. This appearance can be achieved by a suitable texturing of the mold cavity that is used to fabricate the cover.

The end wall presents a suitable surface for an embossed logo, such as that shown. The logo is imparted to the end wall during the molding process. In regard to its fabrication, it is to be noted that the cover can be made by conventional molding techniques, particularly injection molding. The cover is designed with certain draft to facilitate separation of parts of the mold cavity. For example, it can be seen that the side walls 48 and 50 are not precisely perpendicular to end wall 44 because they contain a slight amount of draft. The same condition will be true of certain of the other walls.

As an aid to creating a strong, durable product it is desirable to incorporate certain conventional molding practices into molding of the cover. For example there are a series of five triangularly shaped ribs, 84 each, in spaced apart location across the interior surface of top wall 46. There are also stiffening ribs 86, two per side, between each bottom wall portion 56, 58 and end wall 44. Still further, there is a triangularly shaped brace 88 that joins tongue 76 with the interior surface of end wall 44 within the attachment means. The cooperative effect of this brace with the tongue serves to strengthen the joint between the tongue and end wall, in conjunction with establishing to some extent the force verses deflection characteristics for the tongue.

A suitable material for cover 10 is copolymer polypropylene. This material is well-suited for molding, and is tough and durable. It can withstand a wide range of temperatures while retaining good dimensional stability. It can also tolerate many flexing and relaxing cycles of the catch as the cover is periodically installed on and removed from the hitch tube over the cover's useful life. Drawing FIGS. 3-9 are proportioned for an exemplary cover whose overall dimensions are approximately eight and one-half inches by two and three-fourths inches by one and one-fourth inch.

A common cover can fit a range of different hitch tubes whose vertical dimension for the hitch tube opening is substantially identical, so that the removable snap-fit attachment is achieved, and whose horizontal dimension for the hitch tube opening is equal to or greater than the minimum that will receive attaching portion 42. The lateral and vertical expanses of the cover are also adapted to enable a common cover to serve a range of different hitch sizes.

While a preferred embodiment has been disclosed, it will be appreciated that principles are applicable to other embodiments.

What is claimed is:

1. In combination with the drawbar receiver tube of a towing hitch, said drawbar receiver tube having a tubular wall terminating in an open end via which a drawbar is inserted into the receiver tube, said tubular wall containing a hole in inwardly set relation to the open end thereof via which the drawbar is inserted, a molded plastic cover for covering the open end of the receiver tube when the drawbar is removed therefrom, said cover comprising an end wall covering the open end of the receiver tube and an integral locator and releasable catch projecting from the inside of said end wall to locate the cover on the end of the receiver tube and to releasably latch the cover to the receiver tube by the catch engaging said receiver tube hole when the cover is fully installed on the receiver tube, said integral locator and releasable catch comprising for the integral locator a relatively rigid tubular wall that has an opening in spaced relation from said end wall and that closely fits the open end of the receiver tube tubular wall, and said integral locator and releasable catch having said catch defined in a portion of said relatively rigid tubular wall by a pair of slots that project from said opening in the direction toward said cover's end wall and that lie on either side of the catch whereby when the cover is being installed on and removed from the receiver tube tubular wall, the catch relatively resiliently deflects for passing into and out of the receiver tube tubular wall, and when the cover is fully installed on the receiver tube tubular wall, the catch resiliently relaxes for engaging said hole to latch the cover to the receiver tube tubular wall.

2. The combination set forth in claim 1 in which said catch comprises a button on the free end of a tongue, said tongue providing the resilient deflection of the catch and said button fitting into said hole when the cover is fully installed on the receiver tube tubular wall for thereby latching the cover to the receiver tube tubular wall.

3. The combination set forth in claim 2 in which said opening is at the end of said relatively rigid tubular wall which is opposite said end wall, said slots extend from said opening approximately one-half the depth of said relatively rigid tubular wall, said tongue is generally flat, and further including an integral triangular brace joining the tongue with the end wall of the cover.

4. The combination set forth in claim 1 in which said catch comprises a button having a leading surface which forms a camming surface adapted to abut the open end of the receiver tube tubular wall when the cover is initially fitted to the receiver tube tubular wall and which upon continued displacement of the cover onto the receiver tube tubular wall serves to cam the catch onto a resiliently deflected condition allowing the cover to be moved to the fully installed position on the receiver tube tubular wall where the catch resiliently relaxes to cause the button to be disposed in said hole thereby latching the cover to the receiver tube tubular wall.

5. The combination set forth in claim 4 in which said button is generally circular in shape and contains for said camming surface, a beveled surface extending between an end wall surface and a side wall surface thereof.

6. The combination set forth in claim 5 in which said opening is at the end of said relatively rigid tubular wall which is opposite said end wall, said slots extend from said opening approximately one-half the depth of said relatively rigid tubular wall, said tongue is generally flat, and further including a triangular brace that joins said tongue with the end wall of the cover.

7. The combination set forth in claim 1 in which said relatively rigid tubular wall comprises top, side, and bottom wall portions, and said catch is provided in one of said wall portions of said relatively rigid tubular wall.

8. The combination set forth in claim 7 in which said catch is provided in said bottom wall portion of said relatively rigid tubular wall.

9. The combination set forth in claim 8 in which said catch comprises a generally circular button disposed on the free end of a tongue, said button fitting into said hole when the cover is latched to the receiver tube tubular wall and said tongue providing the resilient deflection of the catch to allow the button to clear said hole when the cover is to be removed from the receiver tube tubular wall, and said button further comprising a beveled surface extending between side and end wall surfaces of the button to form a camming surface that is adapted to abut the end of the receiver tube tubular wall when the cover is initially fitted to the receiver tube tubular wall and that, upon continued movement of the cover onto the receiver tube tubular wall, resiliently cams the catch so that the cover can be fully installed on the receiver tube tubular wall, and when the cover is fully installed, the catch resiliently relaxes to dispose the circular button in said hole thereby latching the cover to the receiver tube tubular wall.

10. The combination set forth in claim 8 in which said cover further comprises top, side, and bottom walls, the top and side walls being disposed in respective covering relation to the top and side wall portions respectively of said relatively rigid tubular wall but said bottom wall having a notch to provide access to the catch for releasing the catch from said hole when the cover is latched to the receiver tube tubular wall.

11. The combination set forth in claim 10 in which the notch in the bottom wall has a depth extending to the edge of said end wall thereby defining a pair of bottom covering portions in the bottom wall to either side of said notch.

12. The combination set forth in claim 1 in which said hitch includes safety chain attaching holes disposed to either side of the drawbar receiver tube, and in which the end wall of said cover is disposed in covering relation to the safety chain attaching holes as well as to the end of the receiver tube.

13. The combination set forth in claim 12 in which said cover further includes top and side walls that project in top and side covering relation to the safety chain attaching holes.

14. The combination set forth in claim 13 in which said cover further includes a bottom wall that has a centrally located notch to provide access to said releasable catch via the bottom of the cover, thereby defining in the bottom wall a pair of bottom covering portions disposed laterally to each side of the notch, and further including stiffening rib structure joining the bottom covering portions with said end wall.

15. The combination set forth in claim 13 in which said cover's end wall, top wall, and side walls provide a generally rectangular shape for the cover, said cover's end, top and side walls having substantially uniform nominal thickness throughout, said relatively rigid tubular wall having thickness that is less than the nominal thickness of said cover's end wall, top wall, and side walls.

16. In combination with the drawbar receiver tube of a towing hitch which has an open end for receiving a drawbar and which also has on either lateral side adjacent the receiver tube's open end accommodations for the attachment of safety chains of a towed vehicle, a cover for covering the receiver tube when the drawbar is removed therefrom, said cover comprising an end wall that laterally spans the open end of the receiver tube and also the safety chain accommodations, said cover comprising additional wall structure that projects transversely of said end wall into at least partially covering relationship to the safety chain accommodations, said additional wall structure comprises a top wall that extends from said end wall in top overlying covering relationship to the safety chain accommodations and side walls that extend from said end wall in lateral overlying covering relationship to said safety chain accommodations, said additional wall structure further comprises bottom wall structure extending in underlying relationship to said top wall, and said cover includes attachment means projecting centrally of said end wall for releasably attaching the cover to the receiver tube, and said bottom wall structure comprises a central notch to provide access to said attachment means for releasing same from attachment to the receiver tube.

17. The combination set forth in claim 16 in which said attachment means comprises a tubular walled structure comprising top, side, and bottom wall portions arranged such that said top wall is top overlying covering relation to said top wall portion, said side walls are in lateral covering relation to said side wall portions, and said bottom wall portion comprises a resiliently yieldable catch via which the cover is releasably connected to the receiver tube.

18. A cover for use in covering the open end of the drawbar receiver tube of a towing hitch when the drawbar is removed therefrom, said drawbar receiver tube having a tubular wall containing said open end and a hole in said tubular wall in inwardly set relation to said open end via which the drawbar is inserted, said cover comprising an end wall for covering the open end of the receiver tube and an integral locator and releasable catch projecting from the inside of said end wall for locating the cover on the end of the receiver tube and for releasably latching the cover to the receiver tube by the catch engaging the receiver tube hole when the cover is fully installed on the receiver tube, said integral locator and releasable catch comprising for the integral locator a relatively rigid tubular wall that has an opening in spaced relation from said end wall and that is adapted to fit the open end of the receiver tube, and said integral locator and releasable catch having for said catch a resiliently deflectable tongue that is defined by spaced apart slots that extend from said opening to a predetermined depth in said tubular wall and an integral engagement means on said tongue for engagement with the receiver tube hole.

19. A cover as set forth in claim 18 in which said catch comprises for said integral engagement means a circular button disposed on the free end of said tongue for fitting into the hole in the receiver tube when the cover is fully installed on the receiver tube for thereby latching the cover to the receiver tube, said button having a camming surface that is adapted to abut the open end of the receiver tube when the cover is initially fitted to the receiver tube and that, upon continued displacement of the cover onto the receiver tube, serves to cam the catch into a resiliently deflected condition for allowing the cover to be moved to the fully installed position on the receiver tube where the catch can resiliently relax to cause the button to be disposed in the hole in the receiver tube thereby latching the cover to the receiver tube.

20. A cover as set forth in claim 19 in which said relatively rigid tubular wall comprises a bottom wall portion and said catch is disposed in said bottom wall portion, said slots extending from said opening to about half the depth of said bottom wall portion.

21. A cover as set forth in claim 20 in which said cover further includes adjoining top, side, and bottom wall structure that extends generally perpendicularly from the edges of said end wall, said bottom wall structure comprises a centrally located notch that provides access to the catch for releasing the catch from the hole in the drawbar receiver tube when the cover is to be unlatched from the receiver tube.

22. A cover as set forth in claim 18 in which said relatively rigid tubular wall is integral with said end wall.

23. A cover for use in covering the open end of the drawbar receiver tube of a towing hitch when the drawbar is removed therefrom, said drawbar receiver tube having a tubular wall containing said open end and a hole in said tubular wall in inwardly set relation to said open end, said cover comprising an end wall that is for end covering relation to the receiver tube, releasable attaching means on the inside of said end wall for releasably attaching the cover to the receiver tube, said cover further including top and side walls for extending from said end wall in covering relation to the receiver tube, and a bottom wall for extending in underlying relation to the receiver tube and beyond said releasable attaching means but comprising a centrally located notch that provides access to the releasable attaching means to enable the releasable attaching means to be released from attachment to the receiver tube when the cover is to be removed from the receiver tube, said releasable attaching means is integral with said cover end wall, and said releasable attaching means comprises a relatively rigid tubular wall extending integrally from the inside of said cover end wall and having an opening in spaced relation to said end wall, and a resiliently deflectable catch formed in the bottom of said relatively rigid tubular wall for releasably engaging said hole, said resiliently deflectable catch thereby providing the releasable attachment of the cover to the drawbar receiver tube.

* * * * *